(12) United States Patent
Watts

(10) Patent No.: US 11,543,013 B1
(45) Date of Patent: Jan. 3, 2023

(54) WORM

(71) Applicant: Titus Gadwin Watts, San Francisco, CA (US)

(72) Inventor: Titus Gadwin Watts, San Francisco, CA (US)

(*) Notice: Subject to any disclaimer, the term of this patent is extended or adjusted under 35 U.S.C. 154(b) by 0 days.

(21) Appl. No.: 17/352,083

(22) Filed: Jun. 18, 2021

Related U.S. Application Data

(60) Provisional application No. 63/084,389, filed on Sep. 28, 2020.

(51) Int. Cl.
*F16H 55/22* (2006.01)
*F16H 55/12* (2006.01)

(52) U.S. Cl.
CPC .......... *F16H 55/22* (2013.01); *F16H 55/12* (2013.01)

(58) Field of Classification Search
CPC ....... F16H 55/12; F16H 55/22; F16H 25/2228
USPC ...................................................... 74/425, 458
See application file for complete search history.

(56) References Cited

U.S. PATENT DOCUMENTS

| | | | | |
|---|---|---|---|---|
| 2,002,644 | A | * | 5/1935 | Pohl ...................... F16H 57/022 74/400 |
| 2,192,188 | A | * | 3/1940 | Green ..................... F16H 55/24 74/440 |
| 2,450,282 | A | * | 9/1948 | Jackson .............. F16H 25/2223 29/893.31 |
| 3,106,103 | A | * | 10/1963 | Smith ..................... F16H 55/22 74/439 |
| 3,805,634 | A | * | 4/1974 | White ...................... B62D 5/24 74/499 |
| 2006/0156843 | A1 | * | 7/2006 | Becker ................ F16H 25/2214 74/424.82 |

* cited by examiner

*Primary Examiner* — Jake Cook
(74) *Attorney, Agent, or Firm* — Plager Schack LLP; Mark H. Plager; Michael J. O'Brien

(57) ABSTRACT

A worm is configured to attach to a shaft and turn a worm gear. The worm has a housing is a first exterior thread. An insert mates to the housing and has a second exterior thread. The first exterior thread and the second exterior thread form a continuous exterior thread.

5 Claims, 2 Drawing Sheets

WORM

RELATED APPLICATION

This application claims priority to provisional patent application U.S. Ser. No. 63/084,389 filed on Sep. 28, 2020, the entire contents of which is herein incorporated by reference.

BACKGROUND

The embodiments herein relate generally to systems that transfer power from one shaft to another.

In a motor there is a motor shaft. There is also a worm that is attached to the motor shaft. The purpose of the worm is to move a worm gear. Prior to embodiments of the disclosed invention, worms were made in one piece. Because worms were made in one-piece worms were difficult to install and more difficult to remove. This caused the worm to break. A one-piece worm could break upon installation and removal, and was difficult to repair or replace. Embodiments of the disclosed invention solve these problems.

SUMMARY

A worm is configured to attach to a shaft and turn a worm gear. The worm has a housing is a first exterior thread. An insert mates to the housing and has a second exterior thread. The first exterior thread and the second exterior thread form a continuous exterior thread.

In some embodiments, the housing further comprises an interior slot. The interior slot further comprises a rear slot, a first side slot, and a second side slot. The interior slot has an interior slot upper platform further comprising an interior shaft slot.

In some embodiments, the insert further comprises a tab, a first clip, and a second clip. The insert further comprises an insert lower edge comprising an insert shaft slot.

Mating the insert to the housing involves the tab mating with the rear slot. Simultaneously, the first clip mates with the first side slot. Simultaneously, the second clip mates with the second first side slot.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
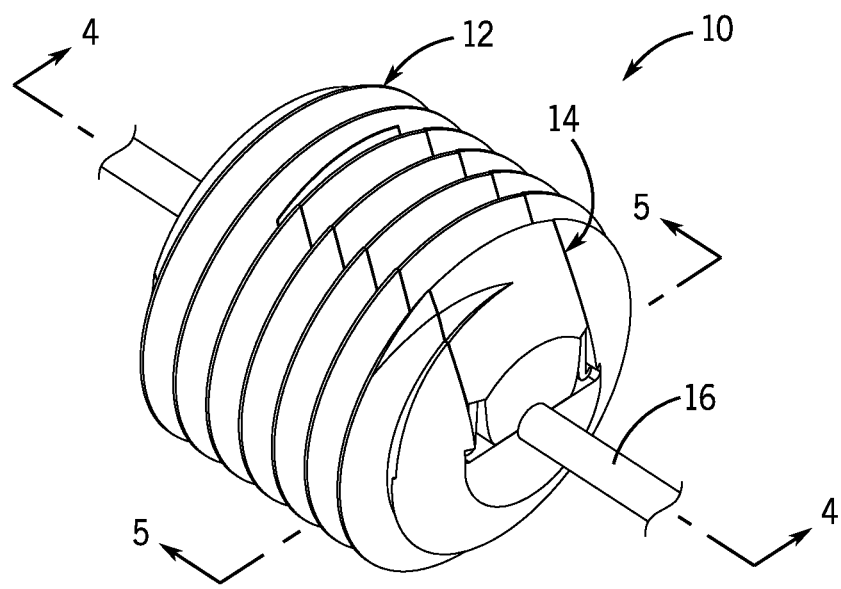
FIG. 1 shows a perspective view of one embodiment of the present invention.
Figure 2:
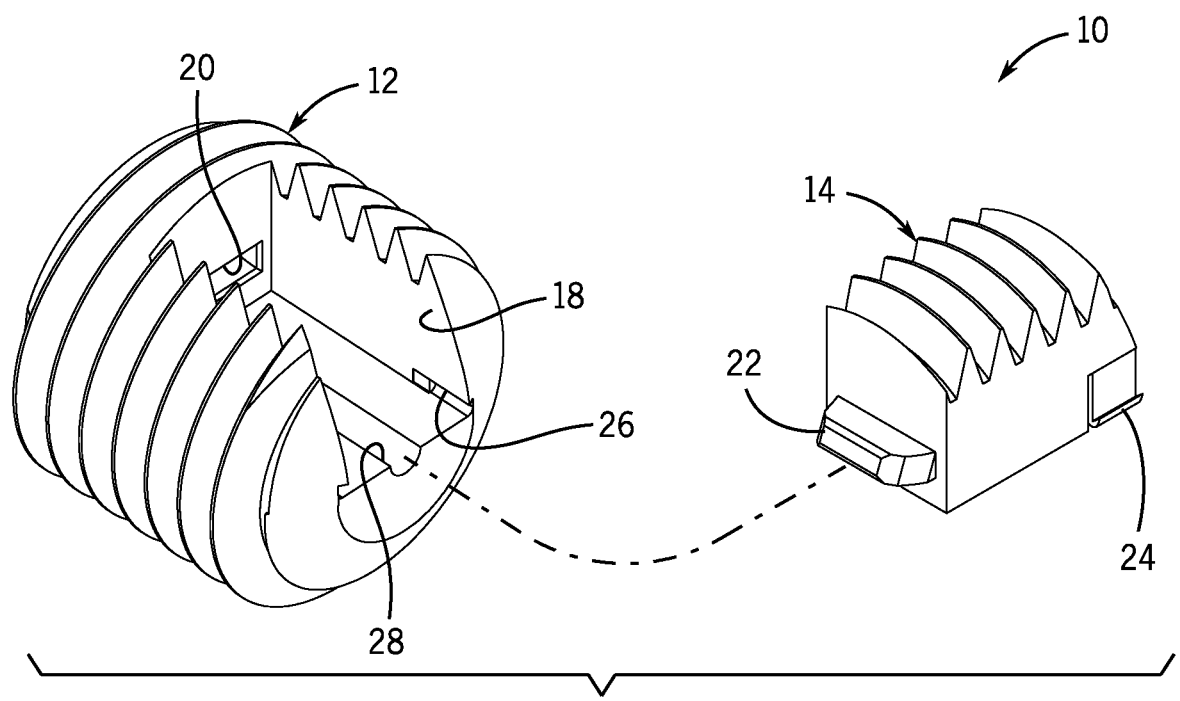
FIG. 2 shows a clamshell exploded perspective view of one embodiment of the present invention.
Figure 3:
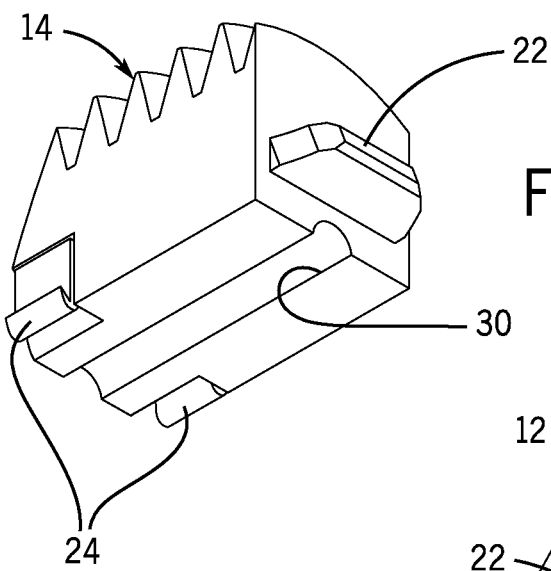
FIG. 3 shows a bottom rear perspective view of one embodiment of the present invention.
Figure 4:
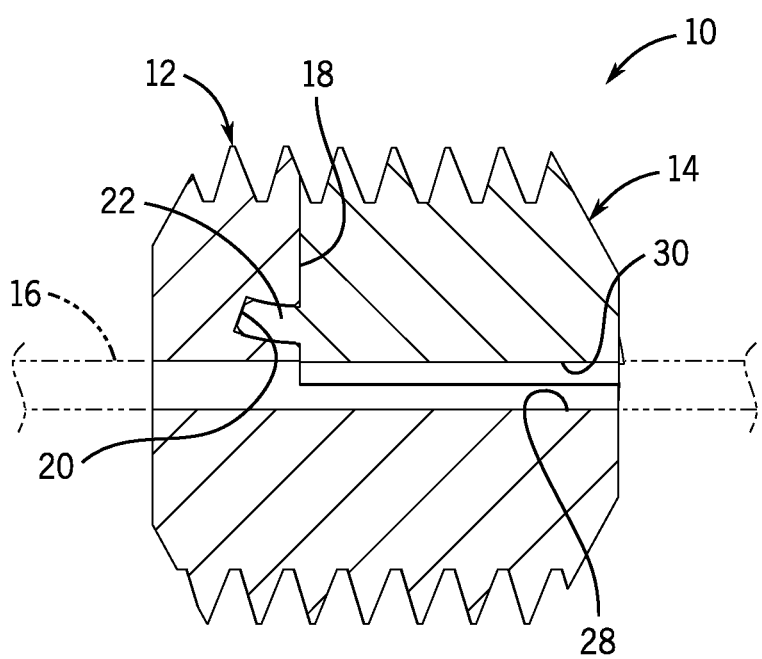
FIG. 4 shows a cross-sectional view of one embodiment of the present invention taken along line 4-4 in FIG. 1.
Figure 5:
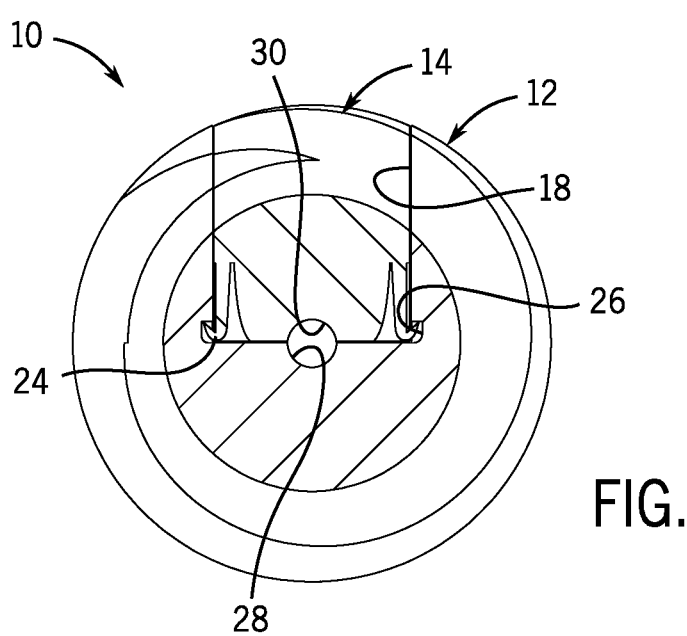
FIG. 5 shows a cross-sectional view of one embodiment of the present invention taken along line 5-5 in FIG. 1.

By way of example, and referring to FIGS. 1-5, one embodiment of a worm assembly 10 comprises a housing 12 joined to an insert 14 that are configured to wrap around a shaft 16.

The housing 12 further comprises an interior slot 18. The interior slot 18 further comprises a rear slot 20, a first side slot 26 and a second side slot 26. The interior slot 18 has an interior slot upper platform further comprising an interior shaft slot 28.

The insert 14 further comprises a tab 22, a first clip 24, and a second clip 24. The insert 14 further comprises an insert lower edge comprising an insert shaft slot 28.

To mate the insert 14 to the housing 12, the tab 22 fits inside the rear slot 20. The first clip 24 fits inside the first side slot 26. The second clip 24 fits inside second first side slot 26.

The housing 12 further comprises a first exterior thread and the insert 14 further comprises a second exterior thread. When the insert 14 mates with the housing 12, the first exterior thread and the second exterior thread combine to form a continuous exterior thread.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A worm, configured to attach to a shaft and turn a worm gear; the worm comprising:
   a housing, further comprising a first exterior thread;
   an insert, mated to the housing and further comprising a second exterior thread;
   wherein the first exterior thread and the second exterior thread form a continuous exterior thread;

wherein the housing further comprises an interior slot;
wherein the interior slot further comprises a rear slot, a first side slot, and a second side slot.

2. The worm of claim 1, wherein the interior slot has an interior slot upper platform further comprising an interior shaft slot.

3. The worm of claim 2, wherein the insert further comprises a tab, a first clip, and a second clip.

4. The worm of claim 3, wherein the insert further comprises an insert lower edge comprising an insert shaft slot.

5. The worm of claim 4, wherein mating the insert to the housing involves:
the tab mating with the rear slot;
the first clip mating with the first side slot; and the second clip mating with the second first side slot.

* * * * *